United States Patent Office 3,632,600
Patented Jan. 4, 1972

3,632,600
DERIVATIVES OF ALIPHATIC-HYDROCARBYL SUBSTITUTED HETEROCYCLIC NITROGEN COMPOUNDS
Peter Reginald Morris, Hartley, near Dartford, England, assignor to Esso Research and Engineering Company
No Drawing. Filed May 31, 1968, Ser. No. 733,311
Int. Cl. C07d 55/04
U.S. Cl. 260—308 B    10 Claims

ABSTRACT OF THE DISCLOSURE

Heterocyclic compounds that are effective detergents and antioxidants for lubricant and fuel compositions have a 5-membered ring having one to three hetero nitrogen atoms, there being attached to a carbon atom or to a nitrogen atom of said heterocyclic ring a hydrocarbyl group, preferably alkyl or alkenyl, having about 20 to 150 carbon atoms. There is also attached to a carbon atom of the heterocyclic ring, or to a carbon atom of a benzene ring that includes carbon atoms of the heterocyclic ring, a group $ZSO_3$—, $ZSO_2$—, $ZS$—, or $ZO$—, where Z is amino or metal. The hydrocarbyl group can be obtained from the polymer of a $C_2$ to $C_6$ olefin hydrocarbon such as polyisobutylene. Specific examples include calcium polyisobutenyl pyrrole sulfonate and calcium N-polyisobutenyl benztriazole sulfonate.

DESCRIPTION OF THE INVENTION

This invention relates to heterocyclic compounds which may be used as multipurpose additives for fuels or lubricants.

It has been found that certain classes of N- containing heterocyclic compounds are effective high temperature detergent inhibitors, and antioxidants for lubricants and fuels, and smoke reducing agents for fuels.

According to this invention heterocyclic compounds suitable as multipurpose additives are those containing a 5- or 6-membered ring with one nitrogen hetero atom or two or three adjacent nitrogen hetero atoms, wherein two adjacent carbon atoms of the heterocyclic ring may form part of a further 6-membered aromatic ring system, wherein there are one or more hydrocarbyl groups attached directly or indirectly (as hereinafter defined) to the heterocyclic ring or an aromatic ring, and wherein said compound also has attached to one or more carbon atoms in either the heterocyclic or an aromatic ring, one or two of the groups $ZSO_3$—, $ZSO_2$—, $ZS$— and $ZO$— where Z is a metal, or the residue of an organic base. By the term "directly" we mean that the hydrocarbyl group is directly attached to a carbon atom in the heterocyclic or aromatic ring or to a nitrogen atom in the heterocyclic ring. By the term "indirectly" we mean that the hydrocarbyl group is attached to a carbon atom in the heterocyclic or aromatic ring by a sulphide (—S—), secondary amine (—NH—), ether (—O—) or a tertiary amine (—N'—) linkage. Preferably the heterocyclic compounds have 5-membered nitrogen-containing rings.

Specific examples of such compounds are those containing the heterocyclic groups.

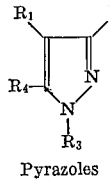
Pyrazoles

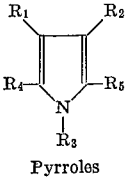
Pyrroles

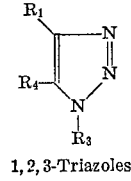
1,2,3-Triazoles and their fused aromatic ring analogues, wherein $R_3$ is hydrogen, or a hydrocarbyl group, one or two of the groups $R_1$, $R_2$, $R_4$ and $R_5$ is or are $ZSO_3$—, $ZSO_2$—, $ZS$—, or $ZO$—, and the remainder of the groups, $R_1$, $R_2$, $R_4$ and $R_5$ are hydrogen, or hydrocarbyl groups, attached directly or indirectly to the heterocyclic ring, or are part of an adjoining benzene ring or naphthalene ring system. It is preferable if $R_3$ is a hydrocarbyl group.

The six-membered aromatic ring system, part of which may be formed by two adjacent carbon atoms of the heterocyclic ring, may be for example a benzene ring or a naphthalene ring system.

The hydrocarbyl group may for example be alkyl, alkaryl, aryl, aralkyl, or alkenyl, and also includes cases where one or more of the hydrogen atoms therein have been substituted by polar substituents, provided however that the polar substituents are not present in proportions sufficiently large to alter significantly the hydrocarbon character of the radical. Such polar substituents are exemplified by chloro, bromo, keto, ethereal, aldehydo or nitro etc. The upper limit with respect to the proportion of such polar substitutents on the group is about 10% based on the hydrocarbyl portion of the group. Such polar substitutent containing groups are referred to as hydrocarbyl groups throughout the specification.

The preferred manner by which the hydrocarbyl chain is joined to the heterocyclic ring is directly or indirectly through a sulphide —S— link.

The hydrocarbyl group is preferably long chain whether attached to a carbon atom or to a nitrogen atom e.g. having between 20 and 150 carbon atoms, preferably between 24 and 70 carbon atoms. This corresponds to average molecular weights of between about 280 and 2100 or preferably about between 340 and 950. The particularly preferred groups are the alkenyl, or alkyl groups derived from the polymerisation of an olefin, e.g. a $C_2$ to $C_6$ olefin and especially isobutene, or the copolymerisation of mixed olefins, e.g. ethylene and butene-1 or butene-1 and styrene.

Polyisobutenyl is the preferred group.

If a hydrocarbyl group is directly attached to a hetero nitrogen atom, the hydrocarbyl group may however be short chain, e.g. a $C_1$ to $C_6$ alkyl group, such as methyl.

The compounds of the invention also contain a sulphur or oxygen containing group, i.e. a sulphonate

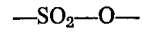
—$SO_2$—O— a sulphinate —SO—O—, a sulphide —S—, or an oxide —O—. Of these groups the sulphonates and oxides are preferred, and they are preferably attached to a bivalent metal, especially the alkaline earth metals, for example, calcium magnesium or barium. If desired however these groups may be attached to a monovalent metal, for example an alkali metal, such as sodium, potassium, or lithium or to the residue of an organic base, such as a primary or secondary amine, for example ethylene diamine or tetraethylene pentamine. When the sulphur containing group is attached to a polyvalent metal, this means that there is more than one heterocyclic ring attached indirectly to the metal.

Excess metal may be present in the additives of the invention for example in the form of a colloidally dispersed oxide, hydroxide or carbonate, such compounds being introduced during the process for manufacture of the additives as hereinafter described.

Examples of suitable heterocyclic compounds of the invention are as follows, where R stands for a polyisobutenyl group

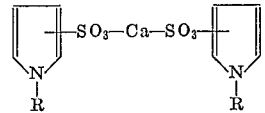

Calcium N-polyisbutenyl pyrrole sulphonate and its other alkali and alkaline earth metal analogues.

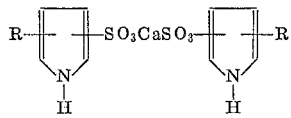

Calcium polyisbutenyl pyrrole sulphonate and its other alkali and alkaline earth metal analogues.

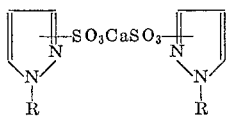

Calcium N-polyisobutenyl pyrazole sulphonate and its other alkali and alkaline earth metal analogues.

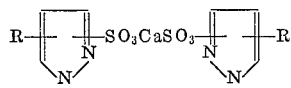

Calcium polyisbutenyl pyrazole sulphonate and its other alkali and alkaline earth metal analogues.

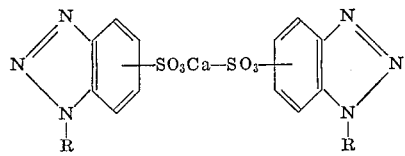

Calcium N polyisobutenyl benztriazole sulphonate and its other alkali and alkaline earth metal analogues.

The compounds of the invention can be prepared in several ways. In order to introduce the hydrocarbyl group into the molecule, a compound containing the heterocyclic ring may be reacted with hydrocarbyl halide, usually in the presence of a base. The hydrocarbyl halide, e.g. chloride, may be for example an alkenyl chloride such as polyisobutenyl chloride; and the base may be an alkali metal carbonate, e.g. anhydrous sodium or potassium carbonate, and is preferably present in approximately molar quantities. The reactants are preferably reacted in an inert atmosphere, and at an elevated temperature, usually between 120° C. and 200° C.

In order to obtain a compound containing a hydrocarbyl group indirectly attached through a sulphur atom, the above described method may be used, except that the compound containing the heterocyclic ring has a mercapto group in the position where it is desired to introduce the hydrocarbyl group.

To introduce the sulphonic acid group, the heterocyclic products containing the hydrocarbyl group prepared as for example by the method described above are treated with one or two moles per mole of product of a sulphonating agent. These agents include chlorsulphonic acid or mixtures of sulphur trioxide and hydrochloric acid gas; sulphuric acid or mixtures of sulphuric acid and sulphur trioxide; sulphur trioxide; and mixtures of sulphur dioxide and air or oxygen.

Sulphinic acids may be prepared preferably by the reduction of the sulphonic acid prepared in the manner described above usually with zinc dust and water or by hydrogen in the presence of a noble metal catalyst.

The corresponding hydrocarbyl mercapto heterocycle compounds of the invention are preferably prepared by protecting the desired mercapto group on the benzene ring during the preliminary alkylation step and then removing the protecting group. Compounds containing the group Z—S as previously described may be prepared from the corresponding hydrocarbyl mercapto heterocycle by treatment with excess of base in a suitable solvent, usually ethylene glycol.

Compounds containing the group ZO— can usually best be prepared by treating the hydroxy hydrocarbyl heterocycle with an excess of base in a suitable solvent.

To obtain the products of the invention containing $ZSO_3$— or $ZSO_2$ groups the acids, usually dissolved in oil, are neutralised with the appropriate quantity of base.

The salts of the said hydroxy and mercapto hydrocarbyl heterocycles are prepared by treating the compound with an excess of the base in the presence of oil and a solvent, usually ethylene glycol.

The additives of the invention can be added in minor proportions by weight to lubricating oils when they act as a detergent and as an antioxidant. Preferred proportions are between 0.1 and 20% by weight, preferably between 1.0% and 10% by weight, based on active matter. Suitable lubricating oils are animal, vegetable or mineral oils, for example petroleum oil fractions ranging from spindle oil to SAE 30, 40 or 50 lubricating oil grades; castor oil, fish oils, oxidised mineral oil or brightstocks. Synthetic esters, such as diesters or complex esters are suitable. In addition to the invention, the lubricating oil may contain minor amounts by weight of other additives, for example a detergent such as calcium or barium nonyl phenol sulphide; a polymeric pour point depressant such as fumarate ester/vinyl acetate copolymers and a V.I. improver.

The additives of the invention can also be added in minor amounts by weight to fuels as detergents, or as smoke-reducing additives. The fuels which are particularly suitable are liquid hydrocarbon fuel oils, especially petroleum distillate fuels boiling below 400° C. and including light fuel oils, gas oils used as fuel for diesel engines, kerosene diesel fuel and gasoline. The amount of additives added to the fuel may be between 0.001% and 5%, perferably between 0.005% and 0.5% by weight, based on active matter.

EXAMPLE 1

N-polyisobutenyl pyrrole was prepared by reacting pyrrole with polyisobutenyl chloride in the presence of base. 80 ml. of freshly distilled pyrrole were mixed with 950 g. of polyisobutenyl chloride derived from a polyisobutene of 900 number average molecular weight and 108 g. of anhydrous sodium carbonate. The mixture was vigorously stirred and heated to 130° C. for 24 hours. The mixture was cooled and diluted with 2 l. of n-heptane to precipitate insoluble matter which was then removed by filtration. The n-heptane solution was then washed twice with dilute hydrochloric acid(1:4) and once with distilled water. The n-heptane was then removed by distillation to yield an oil soluble product with a nitrogen content of 0.8%.

EXAMPLE 2

N-polyisobutenyl pyrazole was prepared in a similar manner to that described in Example I using an equimolecular weight of pyrazole in place of pyrrole.

The filtered oil soluble product had a nitrogen content of 1.7%.

EXAMPLE 3

N-polyisobutenyl benztriazole was prepared by reacting 1 mole of polyisobutenyl chloride with 2 moles of benztriazole.

950 g. of freshly prepared polyisobutenyl chloride derived from a polyisobutene of 900 molecular weight were mixed with 238 g. of benztriazole and heated for 24 hours at 125° C. The mixture was cooled and diluted with 2 l. of n-heptane to precipitate insoluble matter which was removed by filtration. The n-heptane solution was then washed once with water. The solvent was removed by distillation to yield an oil soluble product with a nitrogen content of 2.8% (Dumas method).

EXAMPLE 4

The alkylated heterocycles prepared in Examples 1 and 2 were sulphonated by the following procedure.

1 mole of the alkyl heterocycle was dissoved in an equal weight of diethyl ether and 2.0 moles of chlorosulphonic acid added dropwise over about 1 hour at such a rate that the ether refluxed slowly. Nitrogen was passed over the surface of the reaction to remove hydrogen chloride gas formed during the reaction.

When all the chlorosulphonic acid was added, heat was applied and the ether refluxed for a further four hours. The temperature of the reactants was maintained below 45° C.

The ether solution of the product was poured into an ice and water mixture, 500 ml. n-heptane was then added and the contents shaken to wash the product and to hydrolyse the sulphonylchloride formed to the free acid. The separated organic layer was then distilled under reduced pressure to recover the solvent. The desired N-polyisobutenyl heterocycle sulphonic acid was obtained as the residue.

EXAMPLE 5

The sulphonic acids of the alkylated heterocycles prepared as described in Examples 4 were neutralised with calcium hydroxide to form their respective calcium salts, i.e. calcium N-polyisobutenyl pyrrole sulphonate and calcium N-polyisobutenyl pyrazole sulphonate.

The sulphonic acids were first dissolved in a suitable quantity, usually an equal weight, of a paraffinic solvent refined Middle East distillate lubricant of 160 SUS viscosity at 100° F. About 0.5% wt. of water was then added to the sulphonic acid solution and the temperature raised to 98° C. Calcium hydroxide was then added slowly and the water formed from the neutralisation collected. The rate of addition was regulated by the foaming of the oil, each addition of calcium hydroxide being made when the water formed from the reaction of the previous portion had been evolved.

When the desired quantity of calcium hydroxide had been added, the temperature was raised to 120° C. for one hour to complete the neutralisation and expel the residual water present. The neutralisation No. ASTM-D-974 was measured on the product at this stage, and found usually to be between 2.0 and 5.0 mg. KOH/g. Where the neutralisation number was above this value further calcium hydroxide was added until the neutralisation value was below 5.0 mg. KOH/g. Ethylene glycol (3% wt.) was then added to facilitate complete neutralisation and heating continued for a further hour at 120° C. The product was then stripped at 120–160° C. under a reduced pressure of 1 mm. Hg to remove the added ethylene glycol and filtered under pressure to remove any residual matter.

EXAMPLE 6

The calcium sulphonates of the alkylates of Examples 1 and 2 as prepared by the method of Example 4 were evaluated in a Caterpillar 1–G engine. The additive was tested at a metal concentration of 100 milliequivalents/kg. in the presence of a minor amount of barium/calcium nonyl phenol sulphide (50 meq. metal/kg.) and in a blend of mineral oils A and B. The results given in the attached table show that the compounds of the invention are superior to conventional natural petroleum sulphonates Oils A and B are Middle East Solvent extracted, solvent dewaxed distillate neutral mineral oils of 150 and 600 SSU viscosity at 100° F. respectively.

The definition of meq. metal/kg. is "one thousandth part of the gram equivalent weight of the metal of the additive per kilogram of oil blend."

What is claimed is:

1. A heterocyclic compound, soluble in hydrocarbon fuels and in lubricating oils, and exerting detergent action therein, said compound being a 5-membered heterocyclic ring, and selected from the group consisting of pyrazole, pyrrole, and benztriazole, to which is attached through a carbon atom or a nitrogen atom of said heterocyclic ring an aliphatic hydrocarbyl group of from about 20 to 150 carbon atoms, said hydrocarbyl group containing only carbon atoms and hydrogen atoms, said compound having as the sole additional substituent the group $ZSO_3-$, where Z is an alkali metal or an alkaline earth metal, said group $ZSO_3-$ being attached to a carbon atom of said heterocyclic ring or to a carbon atom of a benzene ring that includes carbon atoms of said heterocyclic ring.

2. A heterocyclic compound as defined by claim 1 wherein said aliphatic hydrocarbyl group is polyisobutenyl.

3. A heterocyclic compound as defined by claim 1 wherein Z is calcium.

4. A heterocyclic compound as defined by claim 1 wherein said aliphatic hydrocarbyl group is obtained by polymerization of a $C_2$ to $C_6$ olefin hydrocarbon.

5. A heterocyclic compound as defined by claim 1 which comprises an alkaline earth metal polyisobutenyl pyrrole sulfonate.

6. A heterocyclic compound as defined by claim 1 which comprises an alkaline earth metal N-polyisobutenyl pyrazole sulfonate.

7. A heterocyclic compound as defined by claim 1 which comprises an alkaline earth metal N-polyisobutenyl benztriazole sulfonate.

8. Calcium polyisobutenyl pyrrole sulfonate.
9. Calcium N-polyisobutenyl pyrazole sulfonate.
10. Calcium N-polyisobutenyl benztriazole sulfonate.

References Cited

UNITED STATES PATENTS 2,234,866  3/1941  Kaufmann  260—310

OTHER REFERENCES

Barry: J. Chem. Soc., 1961, 3851–3.
Rondestvedt et al.: J. Am. Chem. Soc., 77, 6532–40 (1955).

HENRY R. JILES, Primary Examiner
G. T. TODD, Assistant Examiner

U.S. Cl. X.R.

252—33; 260—310 R, 326.9

| Calcium sulphonate from alkyl heterocycle, Example No. | Amount of additive used, meq. metal/kg. | Amount of barium/calcium nonyl phenol sulphide as co-additive, meq. metal/kg. | Base oil, percent weight A | Base oil, percent weight B | Caterpillar performance Top groove, fill percent | Caterpillar performance Overall merit |
|---|---|---|---|---|---|---|
| 1 | 100 | 50 | 20 | 80 | 33 | 77 |
| 2 | 100 | 50 | 20 | 80 | 29 | 90 |
| Ca-petroleum sulphonate | 100 | 50 | 10 | 90 | 40 | 68 |